United States Patent [19]
Welch, Jr.

[11] Patent Number: 4,729,570
[45] Date of Patent: Mar. 8, 1988

[54] FIBERGLASS TRANSPORT TRAILER

[75] Inventor: Harold E. Welch, Jr., Oklahoma City, Okla.

[73] Assignee: B & K Leasing Corporation, Tulsa, Okla.

[21] Appl. No.: 47,175

[22] Filed: May 7, 1987

[51] Int. Cl.[4] ............................................. B60P 3/22
[52] U.S. Cl. .................................. 280/5 C; 105/358; 105/362
[58] Field of Search ...................... 280/5 C, 5 E, 5 R; 105/358, 360, 362; 220/5 A, 414; 296/15

[56] References Cited

U.S. PATENT DOCUMENTS

| | | |
|---|---|---|
| 1,170,560 | 2/1916 | Paul . |
| 2,771,040 | 11/1956 | Folmsbee ............................ 105/362 |
| 3,158,383 | 11/1964 | Anderson et al. ...................... 280/5 |
| 3,163,435 | 12/1964 | Krueger et al. ...................... 280/5 |
| 3,308,769 | 3/1967 | Halcomb et al. ..................... 105/362 |
| 3,450,066 | 6/1969 | Kasprzycki et al. ................. 105/362 |
| 3,700,512 | 10/1972 | Pearson et al. ..................... 220/5 A |
| 3,742,866 | 7/1973 | Needham et al. .................... 105/360 |
| 4,283,066 | 8/1981 | Brown et al. ....................... 280/5 D |
| 4,292,898 | 10/1981 | Gordon et al. .................... 105/238 R |

Primary Examiner—John J. Love
Assistant Examiner—Donn McGiehan
Attorney, Agent, or Firm—Laney, Dougherty, Hessin & Beavers

[57] ABSTRACT

A chassisless fiberglass tank trailer. The tank trailer includes a tank shell formed of a fiberglass reinforced isotholic resin, with fiberglass filaments bias-wound at an angle of approximately 45°. The tank shell has a forward head and a rear head for forming a fluid carrying container. A forward cradle is attached to the tank shell with mounting portions used for mounting a fifth wheel member, and a rear cradle is attached to the tank shell and having mounting portions used for mounting a rear wheel carriage. The cradles further include a plurality of holes extending therethrough and a plurality of protrusions extending therefrom. The holes and protrusions interact with the resin and fiberglass winding to rigidly hold the cradles to the tank shell. A plurality of circumferential reinforcing ribs are located between each of the mounting portions and at other desired locations longitudinally on the tank shell. The ribs are also molded in with fiberglass reinforced resin. Each rib has an enlarged upper portion for providing rollover protection. Prior to applying the fiberglass resin to the cradles and ribs, circumferential bands are positioned thereon for providing additional strength. Openings in the trailer include overflow protection. Baffles may be provided for preventing undesired fluid movement in the trailer.

21 Claims, 7 Drawing Figures

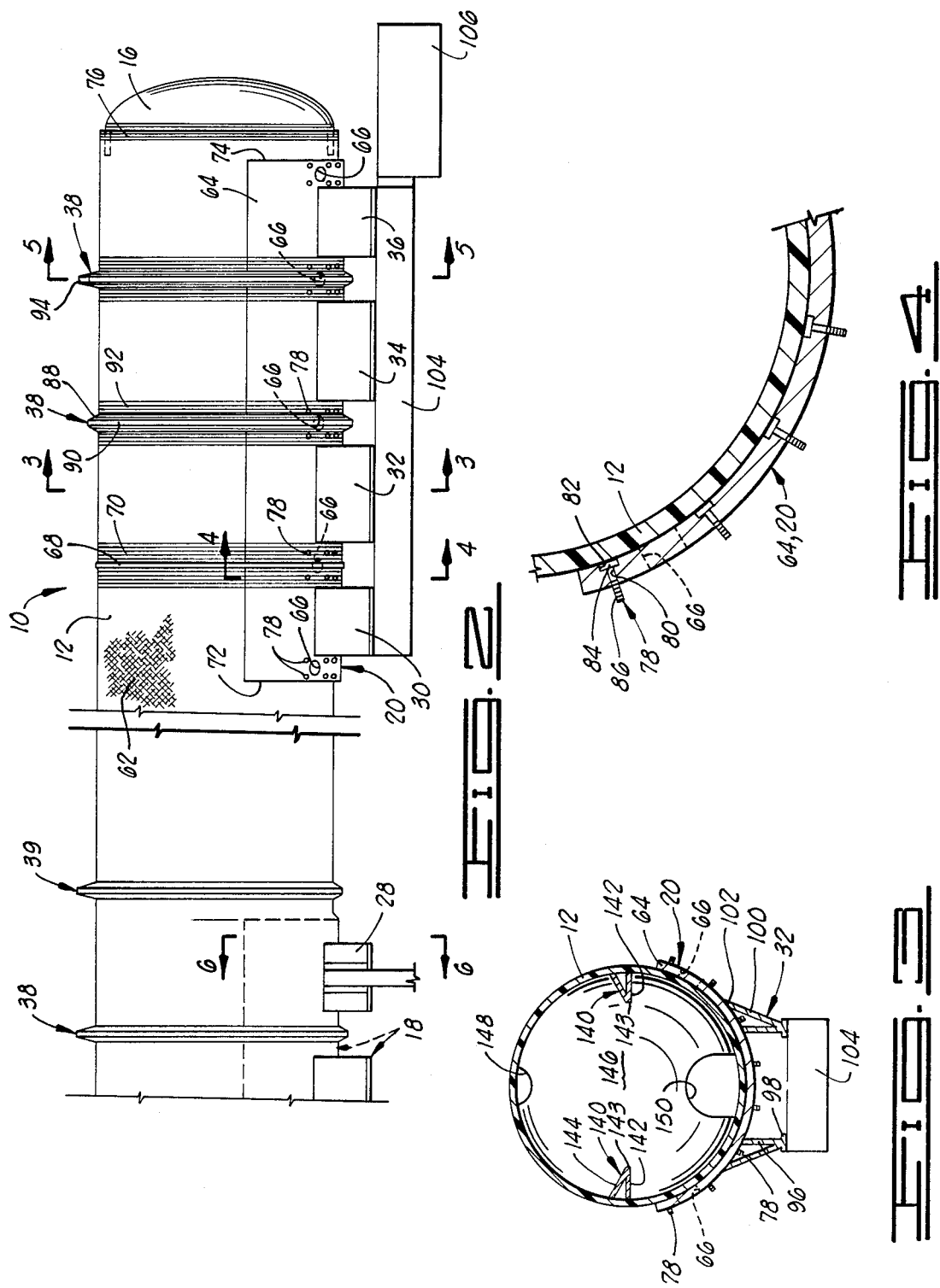

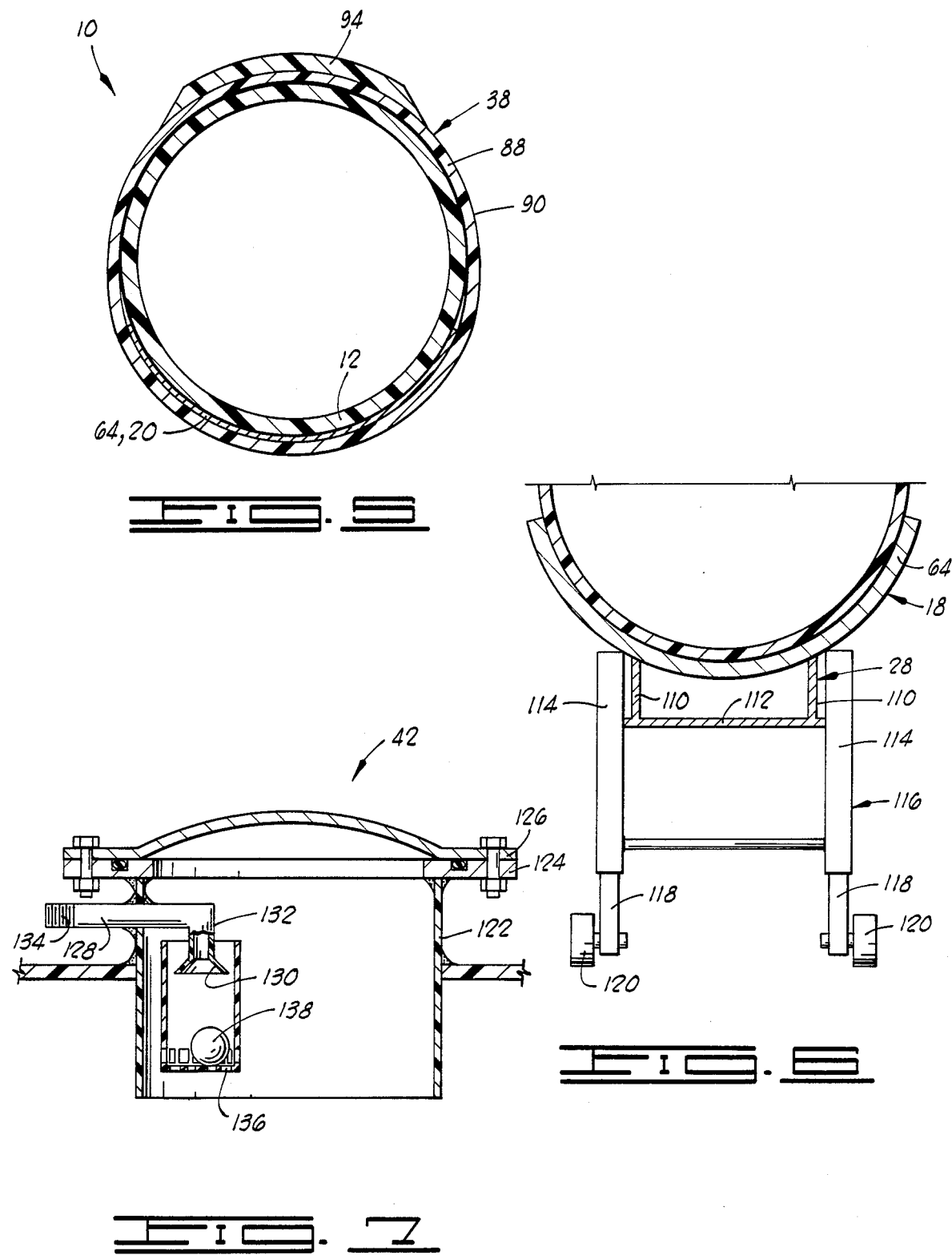

FIBERGLASS TRANSPORT TRAILER

BACKGROUND OF THE INVENTION

1. Field Of The Invention

This invention relates to transport trailers used in carrying fluids, and more particularly, to a figerglass transport trailer having no metal frame.

2. Description Of The Prior Art

Transport trailers with tanks of metal construction are well known in the art, but many problems arise when such trailers are used to carry corrosive fluids. One solution has been to coat the insides of the metal tanks with materials such as resins which are impervious to the fluids. A problem with such construction is that metal tanks are expensive, and the addition of the resin coating is additionally expensive. Further, if cracks or flaws appear in the resin coating, the corrosive fluid is again exposed to the metal tank.

Transport trailers with tanks made completely of fiberglass have been developed to address this problem. Most prior fiberglass transports still require a metal frame for adequate strength of the transport as it travels over the road. Such metal frames are expensive and add additional weight.

One chassis-less fiberglass tank truck is shown in U.S. Pat. No. 3,158,383 to Anderson et al. which discloses a fiberglass tank supported by forward and rear cradles. The tank includes internal ribs to which the cradles are bolted.

The present invention uses metal cradles which are molded to the exterior of the tank shell, and thus no bolting to the tank occurs. The only bolting is where the fifth wheel member and the rear wheel carriage are bolted to the cradles. Each cradle has a plurality of protrusions extending therefrom which are interwound by glass filament during the manufacturing process, thus resulting in a very rigid structure which can be used over a long period of time without maintenance.

SUMMARY OF THE INVENTION

The fiberglass transport trailer of the present invention has no metal frame and comprises a fiberglass tank having an outer wall, a cradle having an upper portion positionable adjacent the tank outer wall and a plurality of longitudinally spaced mounting portions extending from the upper portion, a plurality of circumferential reinforcing ribs extending around the tank outer wall and the upper portion of the cradle, and a fiberglass layer disposed around the ribs and the upper portion of the cradle whereby the cradle and ribs are rigidly molded onto the tank. Preferably, a forward cradle and a rear cradle are used. The cradles are fabricated and mounted in substantially the same manner.

The mounting portions of each cradle include first and second leg portions on opposite sides of a vertical center line of the tank. The ribs are longitudinally positioned adjacent the mounting portions.

The upper portion of each cradle defines a plurality of holes therethrough and a plurality of protrusions extending substantially radially outwardly therefrom. The cradle is positioned adjacent the tank while the resin of the tank is still somewhat soft, such that a portion of the resin at least partially fills the holes. The fiberglass layer lockingly interacts with the protrusions. Thus, the cradles are rigidly attached to the tank.

During the manufacturing process, a circumferential band, preferably fiberglass reinforced, is wrapped around the tank outer surface and the upper portion of the cradle, substantially straddling the holes in the cradle. Styrofoam collars forming the major portions of the reinforcing ribs are disposed around the bands, and a second circumferential band, preferably metal, is disposed around the collar. Once the fiberglass layer is positioned and hardens, the result is a rigid, reinforcing rib. The ribs have an enlarged upper portion for providing rollover protection. It should be noted that the material of the various circumferential bands may vary, and the invention is not limited to the particular materials mentioned.

Baffling means are provided for preventing undesired movement of fluid in the tank. The baffle means include substantially vertically oriented dividers which separate the tank shell into a plurality of sections. Openings or notches in the dividers provide intercommunication between the sections. The baffling means also includes a plurality of longitudinally extending baffles.

The tank has at least one opening therein, and overflow protection means are provided for preventing overflow of fluid from the opening.

An important object of the present invention is to provide a fiberglass transport trailer without a metal frame.

Another object of the invention is to provide a transport trailer with a fiberglass reinforced tank shell with at least one mounting cradle molded thereinto.

Still another object of the invention is to provide a fiberglass transport trailer with a plurality of external, circumferential reinforcing ribs thereon.

A further object of the invention is to provide a mounting cradle for molding into a tank shell on a fiberglass transport trailer wherein the cradle includes a plurality of protrusions extending therefrom which lockingly interact with fiberglass filaments wrapped around the cradle.

Additional objects and advantages of the invention will become apparent as the following detailed description of the preferred embodiment is read in conjunction with the drawings which illustrate such preferred embodiment.

BRIEF DESCRIPTION OF THE DRAWINGS

FIG. 2 is an enlarged elevation of the rear cradle and adjacent area section on the transport trailer shown in various stages during the manufacturing process.

FIG. 3 is a cross-sectional view taken along lines 3—3 in FIG. 2.

FIG. 4 is a cross section taken along lines 4—4 in FIG. 2.

FIG. 5 is a cross-sectional view taken along lines 5—5 in FIG. 2.

FIG. 6 shows a cross section taken along lines 6—6 in FIG. 2.

FIG. 7 is a vertical cross section of a typical tank opening.

DESCRIPTION OF THE PREFERRED EMBODIMENT

Figure 1:
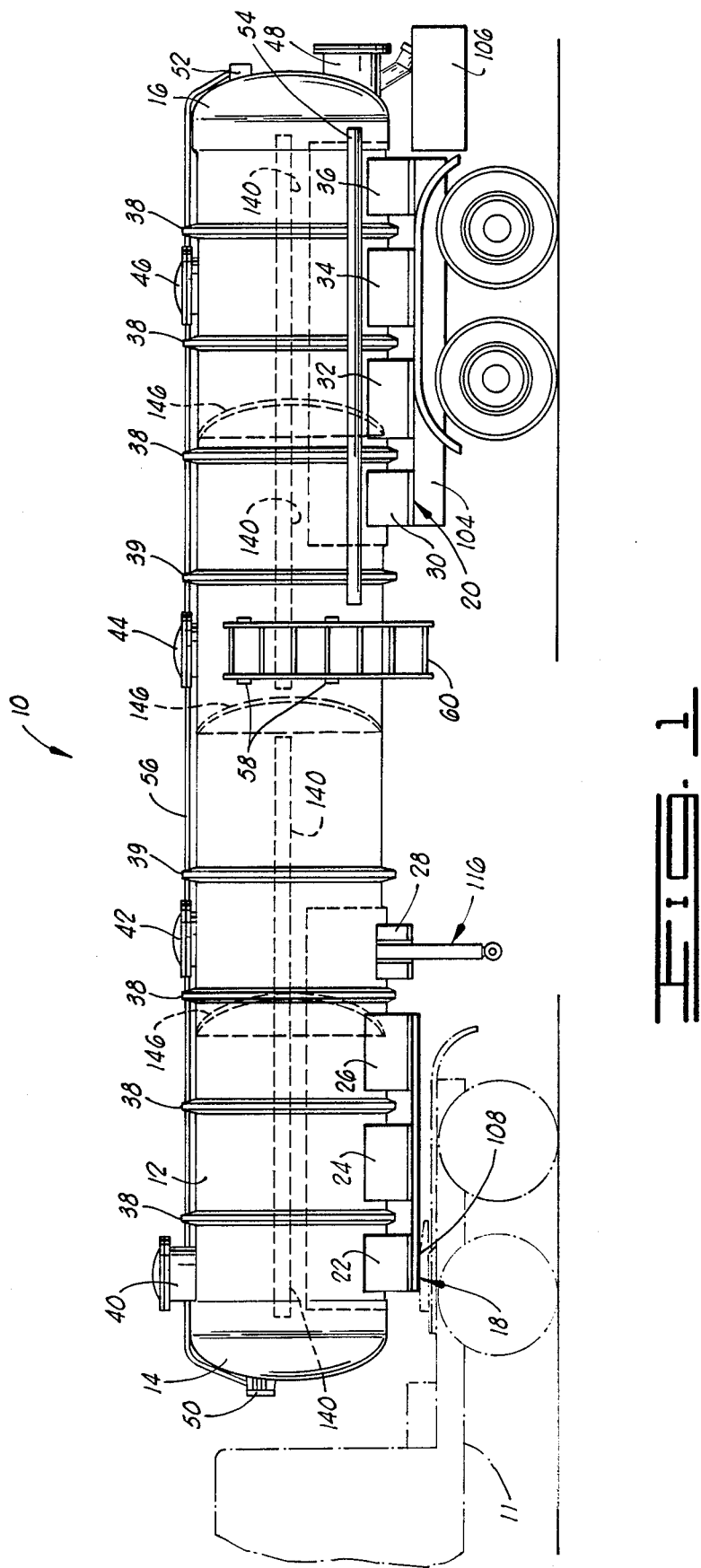
FIG. 1 is a side elevation view of the transport trailer of the present invention shown in an operating position behind a truck tractor.

Referring now to the drawings, and more particularly to FIG. 1, the transport trailer of the present invention is shown and generally designated by the numeral 10, in position behind a truck tractor 11. Trailer 10 includes a tank shell 12 enclosed by a forward head 14 and a rear head 16. Tank shell 12 and forward and rear heads 14 and 16 are made of fiberglass and molded together in a manner hereinafter described. Trailer 10 further includes a forward cradle 18 and a rear cradle 20 which are molded onto tank shell 12 in a manner also hereinafter described. Cradles 18 and 20 are preferably fabricated of aluminum.

Forward cradle 18 includes longitudinally spaced, downwardly extending mounting portions 22, 24, 26 and 28. Rear cradle 20 similarly includes longitudinally spaced, downwardly extending mounting portions 30, 32, 34 and 36.

Molded into tank shell 12 are a plurality of circumferential, external reinforcing ribs 38. Each rib 38 is substantially indentical. It will be seen that a rib 38 is disposed between each of mounting portions 22, 24, 26 and 28 on forward cradle 18 and also between mounting portions 30, 32, 34 and 36 on rear cradle 20. It will be seen that these ribs 38 extend circumferentially around tank shell 12 and cradles 18 and 20.

Additionally, in the embodiment shown in FIG. 1, a rib 39 is positioned rearwardly of mounting portion 28, and another rib 39 is positioned forwardly of mounting portion 30. Ribs 39 are substantially indentical to ribs 38, but do not cover any portion of cradles 18 and 20. The number of ribs 38 and 39 is not limited to the eight shown in FIG. 1 and may vary as necessary according to the length and capacity of transport trailer 10.

Transport trailer 10 further includes a plurality of access openings, such as 40, 42, 44 and 46 at the top thereof. A drain opening 48 is provided at the lowermost rear portion of transport trailer 10. Such openings are known in the art, but in the case of the present invention are manufactured of fiberglass and are integrally molded into tank shell 12.

Additional items such as pressure line manifold 50 used as a connection between tractor 11 and trailer brake lines (not shown), running light bracket 52, hose racks 54 and wiring conduits 56 can also be molded into tank shell 12. Further, a ladder mounting bracket 58 can be molded into tank shell 12 so that a ladder 60 may be attached to the side of transport trailer 10. Additional components typically found on transport trailers may also be attached to tank shell 12.

Referring now to FIG. 2, details of the construction and manufacture of transport trailer 10 will be discussed. FIG. 2 is an enlarged view of the area of transport trailer 10 adjacent rear cradle 20. Each of mounting portions 30, 32, 34 and 36 is also shown.

Tank shell 12 is a cylinder formed on a cylindrical mandrel by bias-winding glass filaments therearound at an angle and a manner known in the art. Preferably, the wide angle is approximately 45° to a horizontal central axis of tank shell 12. The result is multiple crisscross layers of filament, generally designated by the numeral 62, imbedded in an epoxy-like resin. Preferably, the resin is an isotholic resin. It should be understood that the filament pattern indicated by reference numeral 62 is continuously formed along the length and circumference of tank shell 12.

Before all of the resin has hardened after this winding process, forward cradle 18 and rear cradle 20 are placed in position against the soft and still adhesive resin. Referring also to FIG. 3, it will be seen that cradle 20 includes a curvilinear upper portion 64 which is disposed adjacent the outer surface of tank shell 12 and contacts the unhardened resin of tank shell 12.

Along each side of upper portion 64 are a plurality of holes 66 therethrough. At least one hole 66 is positioned forwardly of mounting portion 30 and rearwardly of mounting portion 36, and at least one hole 66 is also disposed in the gaps between mounting portions 30, 32, 34 and 36. When cradle 20 is placed in position in the soft resin of tank shell 12, some resin will tend to fill each of holes 66 from the inside of upper portion 64 toward the outside thereof. Thus, a grouting effect is achieved, and once the resin hardens, holes 66 act to help rigidly lock cradle 20 in place.

At this point in the manufacturing process, a circumferential band 68 is placed around tank shell 12 and upper portion 64 of cradle 20. Bands 68 are preferably fiberglass reinforced, although not limited to this material, and of a type commonly used in packaging. Each band 68 substantially straddles each hole 66, but only one band 68 is shown in FIG. 2 for illustrative purposes. Once bands 68 are in place, additional circumferentially disposed glass filaments 70 are wrapped therearound. This circumferential glass filament winding extends from front end 72 of cradle 20 to mounting portion 30 and also from mounting portion 36 to rear end 74 of cradle 20. Further, circumferential filaments 70 fill the gaps between mounting portions 30, 32, 34 and 36. During the winding of circumferential filament 70, additional resin inwardly fills in the remainder of holes 66 from the outside of upper portion 64. It will thus be seen that, once the resin is hardened, cradle 20 is rigidly affixed to tank shell 12. Forward cradle 18 is attached to tank shell 12 in a substantially identical manner as rear cradle 20.

Additional circumferential filament 76 is wrapped around the joint between tank shell 12 and rear head 16. Such filament is also used at the joint between tank shell 12 and forward head 14.

Referring also to FIG. 4, a plurality of protrusions 78 extend radially outwardly from upper portion 64 of cradle 20. These protrusions basically form two circumferential rows straddling each hole 66. As filament 70 is wrapped around tank shell 12 and upper portion 64 of cradle 20, the filament lockingly engages each of protrusions 78. Once the resin is hardened, this interaction of protrusions 78 with filament 70 further help rigidly lock cradle 20 in place against tank shell 12. Again, forward cradle 18 is constructed in a similar manner.

In FIG. 4, one embodiment of protrusions 78 is shown. In this embodiment, upper portion 64 of rear cradle 20 defines a plurality of holes or apertures 80 extending radially therethrough, each of said holes having a countersink 82 on the radially inward side thereof. Preferably, holes 80 are threaded, and a bolt 84 is threadingly inserted therein such that the threaded portion 86 thereof extends radially outwardly from cradle 20 to form protrusions 78. A straight pin could replace bolt 84 in an unthreaded hole. Other ways of creating protrusions 78, such as stamping the protrusions in upper portion 64 of cradle 20 could also be used, and the protrusions are not intended to be limited to the specific configuration shown in FIG. 4.

Referring again to FIG. 2, the forming of rib 38 begins by positioning a circumferential collar 88 around tank shell 12 and upper portion 64 of cradle 20. In FIG. 2 this is shown between mounting portions 32 and 34 of cradle 20. Collar 88 is preferably made of styrofoam. A band 90, preferably metal but not limited to metal, is circumferentially wrapped around the outer surface of collar 88 for holding the collar in place. Once collar 88 is so held, additional circumferential filaments 92 are wound around collar 88 and band 90. This filament extends fully between the mounting portions, and thus it will be seen that there will be some additional interaction between filaments 92 and protrusions 78. It will be seen that after the resin is hardened, collar 88 thus rigidly forms rib 38. Such a collar 88 and band 90 is used to form each of ribs 38, as shown in FIG. 1. Ribs 39 are formed in substantially the same manner. Only one collar 88 and band 90 is shown in FIG. 2 between mounting portions 32 and 34 for illustrative purposes. A completed rib 38 is also shown in FIG. 2 between mounting portions 34 and 36. However, it should be understood that a similar rib 38 is formed between mounting portions 30 and 32 and in the other locations shown in FIG. 1.

Referring now to FIG. 5, a cross section of a complete rib 38 is shown in place on tank shell 12. In this cross section, collar 88 and band 90 are shown disposed around tank shell 12 and upper portion 64 of cradle 20. Affixed to the top of collar 88 is a cap portion 94. Cap portion 94 is positioned during the winding of filaments 92 so that at least some of filaments 92 wrap therearound to rigidly hold it in place at the top of transport trailer 10. Cap portion 94 provides a raised section on each of ribs 38 which provides some protection for openings such as 42, 44 and 46 in the event of a rollover of transport trailer 10. This rollover protection is also afforded to other items such as conduit 56 which appears in FIG. 1.

It will thus be seen that FIG. 2 provides a complete illustration of the sequence of mounting cradle 20, and thus cradle 18, in the manufacturing process of transport trailer 10. It will also be seen that the result is a rigid reinforced structure for a transport trailer 10 which does not require a supporting chassis along the length thereof.

Referring again to FIG. 3, details of the construction of mounting portion 32 of rear cradle 20 are shown. Mounting portion 32 is illustrative of other mounting portions 34 and 36, as well as mounting portions 24, 26 and 28 of front cradle 18.

Mounting portion 32 includes a pair of substantially vertical support members or legs 96 on opposite sides of a vertical center line of tank shell 12, and each of vertical members 96 has a substantially horizontal flange 98 at the lower end thereof. Extending outwardly and upwardly from each flange 98 adjacent each vertical member 96 is an angularly disposed gusset 100 which is also attached to another point 102 on upper portion 64 of cradle 20. Thus, a strong structure is formed to which may be mounted wheel carriage 104 which has rear bumper 106 (see FIGS. 1 and 2) extending rearwardly therefrom.

Similarly, fifth wheel member 108 may be attached to forward cradle 18.

Referring now to FIG. 6, the details of mounting portion 28 of front cradle 18 are shown. Mounting portion 28 also includes a pair of vertical support members or legs 110 similar to vertical support members 96 in the other mounting portions, but no angularly disposed gusset is used in mounting portion 28. A plate 112 extends between vertical members 100. Attached to the outer sides of each vertical member 100 is a leg 114 of a parking wheel assembly 116. The rest of parking wheel assembly 116 is substantially identical to parking wheel assemblies known in the art and includes telescoping portions 118 with wheels 120 attached thereto.

Referring now to FIG. 7, a cross-sectional detail of opening 42 is shown, and opening 42 is generally representative of any openings 40, 44 and 46 as well. Opening 42 includes a substantially vertically oriented cylindrical portion 122 with an outwardly extending flange 124 thereon to which is attached cover 126. A substantially L-shaped nozzle 128 extends through cylindrical portion 122. A substantially conical seat 130 is positioned at the lower end of downwardly extending leg 132 of nozzle 128. Outer end 134 of nozzle 128 is threaded for connection to fluid filling lines, and may also be capped when not in use.

Positioned around seat 130 and at least part of downwardly extending leg 132 of nozzle 128 is a float ball cage 136 in which is disposed a float ball 138. As the fluid level in tank shell 12 rises, float ball 138 will float upwardly such that it engages conical seat 130 and acts as an overflow prevention means for preventing overflow of fluids in transport trailer 10. In other words, nozzle 128 in association with ball 138 in seat 130 acts as a one-way check valve means for allowing fluid flow into tank shell 12 while preventing fluid flow outwardly therefrom.

Referring again to FIGS. 1 and 3, baffling means may be used in transport trailer 10 to prevent undesired movement and sloshing of fluids therein as the transport trailer is moved along the road. In the preferred embodiment, the baffling means includes a plurality of longitudinally extending baffles 140 positioned along the interior of tank shell 12 on opposite sides of the vertical center line thereof. As shown in the cross section of FIG. 3, each longitudinal baffle 140 includes a horizontal portion 142 with a radially inner edge 143 and an angularly disposed portion 144 extending upwardly and outwardly of inner edge 143. Longitudinal baffles 140 help prevent rotational sloshing of fluids about the longitudinal axis of transport trailer 10, such as are incurred when the transport trailer is turned.

Additional baffle means in the form of vertical, curvilinearly configured dividers 146 are disposed at various longitudinal locations along the interior of tank shell 12. It will be seen that dividers 146 separate transport trailer 10 into separate compartments or sections. If dividers 146 are solid, different fluids may be carried in each section. However, normally transport trailer 10 is used to carry one fluid, and as shown in FIG. 3, each divider 146 has a small notch 148 in the upper end thereof and a relatively larger notch 150 in the lower end thereof. Lower notches 150 allow free fluid flow between the compartments defined by dividers 146, and upper notches 148 allow communication of the air or vapor pocket in transport trailer 10 above the fluid. Thus, it will be seen by those skilled in the art that the fluid levels and pressures, if any, are always equalized.

Dividers 146 act as baffling means for preventing undesired fluid movement and sloshing in a longitudinal direction in transport trailer 10, such as is generally incurred during acceleration and braking of the vehicle.

It will be seen, therefore, that the transport trailer of the present invention is well adapted to carry out the ends and advantages mentioned, as well as those inherent therein. While a presently preferred embodiment of the apparatus has been described for the purposes of this disclosure, numerous changes in the construction and arrangement of parts may be made by those skilled in the art. All such changes are encompassed within the scope and spirit of the appended claims.

What is claimed is:

1. A tank trailer comprising:
   a fiberglass tank having an outer wall;
   a cradle comprising:
      an upper portion positionable adjacent said outer wall of said tank; and
      a plurality of longitudinally spaced mounting portions extending from said upper portion, each mounting portion including first and second leg portions on opposite sides of a vertical center line of said tank;
   a plurality of circumferential reinforcing ribs extending around said outer wall of said tank and said upper portion of said cradle, said ribs being longitudinally positioned between adjacent mounting portions; and
   a fiberglass layer disposed around said ribs and a portion of said upper portion of said cradle between adjacent mounting portions, whereby said cradle and ribs are rigidly molded onto said tank.

2. The tank trailer of claim 1 wherein:
   said fiberglass tank includes an epoxy resin therein; and
   said upper portion of said cradle defines a plurality of holes therethrough, a portion of said resin at least partially filling said holes.

3. The tank trailer of claim 1 wherein said cradle further comprises a plurality of protrusions extending substantially outwardly from said upper portion thereof such that said fiberglass layer lockingly interacts with said protrusions.

4. The tank trailer of claim 1 wherein said upper portion of said cradle extends forwardly and rearwardly of said mounting portions.

5. The tank trailer of claim 1 further comprising a circumferential band disposed around said reinforcing ribs and under said fiberglass layer.

6. The tank trailer of claim 1 wherein said ribs have an enlarged upper portion for providing rollover protection.

7. A tank trailer comprising:
   a tank comprising:
      a substantially cylindrical tank; and
      a substantially hemispherical head attached to a forward and a rearward end of said tank;
   front and rear cradles, each of said cradles comprising:
      a curvilinear portion positioned adjacent an outer surface of said tank shell, said curvilinear portion defining a plurality of holes therethrough and a plurality of protrusions extending therefrom; and
      a plurality of legs extending downwardly from said curvilinear portion such that a plurality of longitudinal gaps are defined therebetween, at least some of said holes in said curvilinear portion being substantially aligned with said gaps;
   a plurality of circumferential bands disposed around said tank shell and said curvilinear portion of said cradles, each of said bands being substantially aligned with one of said holes through said curvilinear portion of said cradles;
   a plurality of circumferentially ribs, each of said ribs being disposed around one of said bands; and
   a layer of filament and resin extending circumferentially around said ribs and covering said ribs and said gaps.

8. The tank trailer of claim 7 wherein:
   said curvilinear portion of said cradles further defines a plurality of apertures therethrough; and
   said protrusions are formed by a plurality of pins extending through said apertures radially outwardly from said curvilinear portion.

9. The tank trailer of claim 7 further comprising baffle means for preventing undesired movement of fluid.

10. The tank trailer of claim 9 wherein said baffle means comprises a plurality of substantially vertically oriented dividers, said dividers separating said tank shell into a plurality of sections.

11. The tank trailer of claim 10 wherein said dividers have a substantially curvilinear configuration.

12. The tank trailer of claim 10 wherein said baffles define a plurality of notches therethrough for allowing intercommunication of fluid between said sections.

13. The tank trailer of claim 9 wherein said baffle means is characterized by a plurality of longitudinally extending baffles disposed in said tank shell.

14. The tank trailer of claim 13 wherein each of said longitudinal baffles comprises a horizontal portion having a radially inner edge and an angularly disposed portion extending upwardly and outwardly from said inner edge of said horizontal portion.

15. The tank trailer of claim 7 wherein said tank is formed of a fiberglass reinforced isotholic resin.

16. The tank trailer of claim 15 wherein said fiberglass is characterized by bias-wound fiberglass filaments.

17. The tank trailer of claim 16 wherein said bias-wound filaments are wound at an angle of approximately 45° to a horizontal central axis of said tank shell.

18. The tank trailer of claim 7 further comprising an inlet fitting having overflow prevention means.

19. The tank trailer of claim 18 wherein said overflow prevention means comprises:
   an inlet nozzle with a downwardly facing substantially conical seat; and
   a float ball for engaging said seat when a fluid level in said tank reaches a predetermined level.

20. The tank trailer of claim 7 further comprising a second plurality of bands, each band being circumferentially disposed around said ribs and under said layer of filament and resin.

21. The tank trailer of claim 7 wherein:
   said curvilinear portion includes forward and rear longitudinal extensions with respect to said legs; and
   a band is disposed around said tank shell and each of said forward and rear extensions.

* * * * *

UNITED STATES PATENT AND TRADEMARK OFFICE
CERTIFICATE OF CORRECTION

PATENT NO. : 4,729,570
DATED : March 8, 1988
INVENTOR(S) : Harold E. Welch, Jr.

It is certified that error appears in the above-identified patent and that said Letters Patent are hereby corrected as shown below:

Column 1, line 26, delete hyphen between "chassis" and "less".

Column 3, lines 16 and 25, delete "indentical" and insert --identical-- therefor.

Claim 7, line 22, delete "circumferentially" and insert --circumferential-- therefor.

Signed and Sealed this

Ninth Day of August, 1988

Attest:

DONALD J. QUIGG

Attesting Officer

Commissioner of Patents and Trademarks